United States Patent [19]

Buck

[11] 4,162,080
[45] Jul. 24, 1979

[54] DRILL CHUCK

[76] Inventor: James R. Buck, P.O. Box 125, Richland, Mich. 49083

[21] Appl. No.: 848,410

[22] Filed: Nov. 4, 1977

[51] Int. Cl.² .................. B23B 31/04; B23B 31/12
[52] U.S. Cl. .......................... 279/1 DC; 279/1 W; 279/48; 279/52; 279/60; 401/92; 408/240
[58] Field of Search .................. 279/60, 64, 48, 51, 279/1 D, 1 DC, 1 W, 65, 1 R, 46, 50, 1 ME; 401/67, 92, 93; 408/240

[56] References Cited

U.S. PATENT DOCUMENTS 2,686,681  8/1954  Nyland ........................ 279/1 W
3,716,247  2/1973  Sato ............................. 279/1 SG

FOREIGN PATENT DOCUMENTS 428638  12/1947  Italy .............................. 279/46
901999   7/1962  United Kingdom ............ 279/46

Primary Examiner—Othell M. Simpson
Assistant Examiner—Z. R. Bilinsky
Attorney, Agent, or Firm—Blanchard, Flynn, Thiel, Boutell & Tanis

[57] ABSTRACT

A drill chuck, specifically for use on a portable powered drill, for selectively and releasably engaging the shank of a drill bit. The chuck includes a support secured to the drive shaft of the drill, and an actuator which is axially movable relative to the support. A holder is disposed between the support and the actuator for grippingly engaging the drill bit. The holder includes an annular support ring movably positioned within the support and having a plurality of springlike arms which project radially inwardly and are disposed for gripping engagement with the drill bit. A first pair of diametrically opposed arms extend axially from one side of the support ring, and a further pair of arms project axially from the other side of the ring, the latter pair being angularly offset with respect to the first-mentioned pair. The support and actuator have camming shoulders which, when the actuator is axially displaced toward the support, engage the arms for camming same radially inwardly into gripping engagement with the drill bit.

13 Claims, 6 Drawing Figures

DRILL CHUCK

FIELD OF THE INVENTION

This invention relates to a drill chuck and, in particular, to a simplified chuck particularly suitable for use on portable powered drills and the like.

BACKGROUND OF THE INVENTION

Powered drills, whether portable or of the press type, conventionally utilize a gear-type chuck for holding the drill bit. While gear chucks are highly desirable for use on heavy-duty drills, specifically for commercial and industrial applications, nevertheless there has long existed a need for a simplified and less expensive drill chuck for use on smaller light-duty drills of the type utilized in home workshops and the like. While gear chucks have been successfully utilized on large numbers of light-duty drills, nevertheless the gear chuck is expensive which adds significantly to the cost of the overall drill. While most light-duty drills do not require a chuck possessing the durability and complexity of a gear chuck, nevertheless the lack of a suitable and less expensive alternative has necessarily resulted in continued use of gear chucks on light-duty drills.

Accordingly, it is an object of the present invention to provide an improved drill chuck which is substantially simpler and less expensive than a conventional gear chuck, and is thus particularly suitable for use on light-duty drills, such as conventional portable electric drills and light duty drill presses of the type conventionally utilized in home workshops and the like.

More particularly, it is an object of this invention to provide an improved drill chuck, as aforesaid, which is particularly adapted for attachment to portable drills, which can be manufactured efficiently and economically so that the resulting cost of the chuck does not constitute a significant part of the cost of the overall drill, which is extremely simple and dependable in operation, which permits secure gripping and driving of the drill bit for most light-duty applications, and which permits simple and inexpensive replacement of the tool gripping member when necessary.

Other objects and purposes of the invention will be apparent to persons familiar with structures of this general type upon reading the following specification and inspecting the accompanying drawings.

Figure 1:
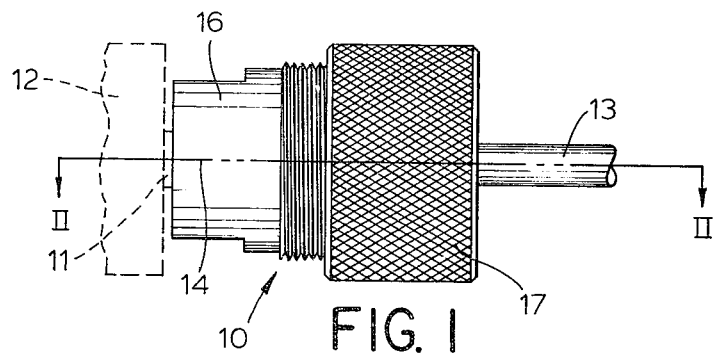
FIG. 1 illustrates a drill chuck of the present invention as attached to a conventional portable electric drill.

Certain terminology will be used in the following description for convenience in reference only and will not be limiting. For example, the words "upwardly," "downwardly," "leftwardly" and "rightwardly" will refer to directions in the drawings to which reference is made. The word "front" will refer to the outer end and the word "rear" will refer to the opposite end of the tool chuck. The words "inwardly" and "outwardly" will refer to directions toward and away from, respectively, the geometric center of the chuck and designated parts thereof. Said terminology will include the words specifically mentioned, derivatives thereof, and words of similar import.

SUMMARY OF THE INVENTION

The objects and purposes of the invention, including those mentioned above, have been met by providing a chuck which includes a substantially cylindrical support which attaches to the drive shaft of the drill, and a cuplike actuator which is mounted on and axially movable relative to the support. The support and actuator define an interior chamber in which is positioned a tool holder formed as an annular support ring having a plurality of springlike arms projecting therefrom. A first pair of diametrically opposed arms project radially inwardly and axially outwardly from one side of the support ring, and a further pair of springlike arms project radially inwardly and axially outwardly from the other side of the support ring. The two pairs of arms are preferably angularly offset with respect to one another. The support and actuator have opposed shoulderlike cams which, when the support and actuator are relatively axially moved toward one another, engage the arms and resiliently deflect same radially inwardly for gripping engagement with the shank of a drill bit. Each pair of arms grip the shank on diametrically opposite sides thereof, and the two pairs of arms grip the shank at a pair of axially spaced locations so that the drill shank is securely and nonrotatably supported on the holder. The complete chuck rotates with the drive shaft of the drill, thereby causing the desired rotation of the drill bit. In a preferred embodiment, the tool holder is preferably formed from four identical ringlike washers which are each formed from a platelike material, with each washer having one of said arms integrally attached thereto. The four washers are fixedly secured together to form a laminated ringlike structure, with the arms being suitably disposed so as to form the two pairs mentioned above.

DETAILED DESCRIPTION

FIG. 1 illustrates therein an improved tool chuck 10 according to the present invention, which chuck is adapted to be attached to the rotatable drive shaft 11 of a conventional drill, such as a drill press or a portable electric drill, a portion of which is illustrated at 12. The chuck 10 is adapted to nonrotatably but releasably support the shank 13 of a conventional drill bit or similar tool to permit rotation thereof about the axis 14.

Figure 2:
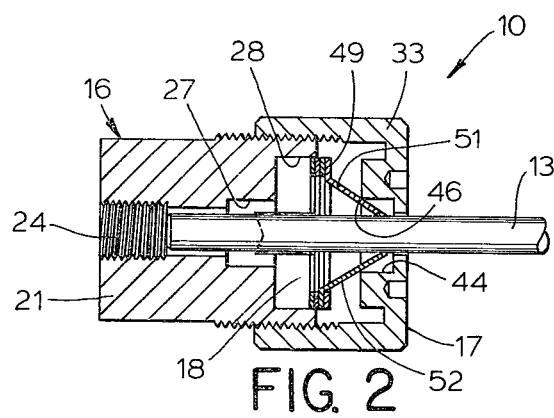
FIG. 2 is a central cross-sectional view of the tool chuck as taken along line II—II in FIG. 1.
Figures 3, 4, 5, 6:
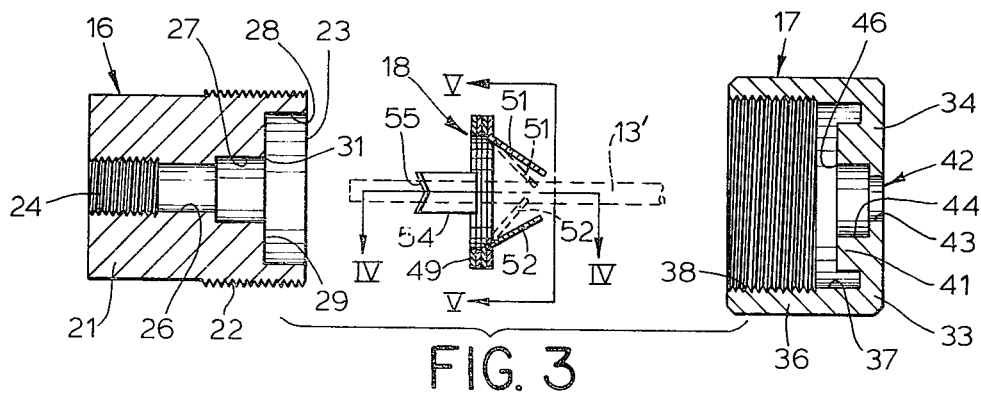
FIG. 3 is a sectional view similar to FIG. 2 but showing the drill chuck in a separated condition.
FIG. 4 is a view of the tool holder as taken along line IV—IV in FIG. 3.
FIG. 5 is an end view of the tool holder as taken along line V—V in FIG. 3.
FIG. 6 is a perspective view of one of the washers used in the tool holder.

The chuck 10, as illustrated in FIGS. 2 and 3, is comprised of three main parts, namely a support 16, an actuator 17 and a tool holder 18.

The support 16 comprises a generally cylindrical member 21 having a partially threaded peripheral surface 22 adjacent the forward end thereof. A stepped bore 23 is formed coaxially inwardly form the front end of the support, which stepped bore 23 communicates with and is coaxially aligned with a threaded bore 24 which extends inwardly from the rear face of the support. This threaded bore 24 is adapted to receive therein the threaded free end of the drive shaft 11 so as to nonrotatably couple the support 16 thereto.

The stepped bore 23, as illustrated in FIG. 3, includes an inner bore 26 which is sized so as to freely accommodate therein the inner end of the drill shank 13. This inner bore in turn communicates with an enlarged intermediate clearance bore 27, and this latter bore in turn communicates with an enlarged outer bore 28 which opens outwardly through the front face of the support. These bores are all of substantially cylindrical configuration and are concentric with the axis 14. The outer bore 28 terminates in a bottom wall 29 which, at its junction with the clearance bore 27, defines an annular edge or shoulder 31, the purpose of which is explained hereinafter.

The actuator 17 is, in the illustrated embodiment, formed as a substantially cylindrical cup-shaped member 33 having a bottom or front wall 34 and a rearwardly projecting cylindrical skirt 36. The cup-shaped member 33 defines therein a substantially cylindrical bore 37 which opens outwardly through the rear end of the member, and a part of the peripheral wall of the bore 37 is threaded at 38. The internal threads 38 are engageable with the external threads 22 formed on the support 16.

The front wall of acutator 17 is provided with a central substantially cylindrical enlargement 41, and a stepped bore 42 extends through the front wall in coaxial alignment with the bore 37. This stepped bore 42 includes a smaller diameter bore 43 which projects inwardly from the front face and terminates in a larger diameter clearance bore 44, which latter bore in turn opens into the main bore 37. The diameters of the bores 43 and 44 are substantially identical to the diameters of the bores 26 and 27, respectively, as formed in the support 16. The clearance bore 44, where it terminates at the inner face of the cylindrical enlargement 41, results in the formation of an annular edge or shoulder 46, which shoulder is disposed directly opposite and of substantially the same diameter as the shoulder 31 formed on the support 16.

The support 16 and actuator 17 thus define a rotatable two-part housing for confining the tool holder 18.

Considering now the tool holder 18, same includes a circular support ring 49 which is axially movably disposed within the outer bore 28, preferably being axially slidably guided by the wall of bore 28. The support ring has a plurality of tool gripping jaws 51–54 mounted thereon. These jaws are formed as resiliently flexible platelike arms which project radially inwardly and axially away from the support ring, with each arm having a V-shaped tool engaging notch 55 formed in the free end thereof. The arms 51 and 52 form one cooperative pair, and these arms are attached to the support ring 49 at substantially diametrically opposite points thereof and project axially outwardly from one side of the support ring. The other arms 53 and 54 form a second cooperative pair, with the arms of this pair also being attached to the ring 49 at diametrically opposite points and projecting axially outwardly thereof in the opposite direction. The pair of arms 53–54 are circumferentially displaced from the pair of arms 51–52, which displacement in the illustrated embodiment is approximately 90°.

The tool holder 18 is preferably formed from a plurality of identical washerlike elements which are fixedly connected so as to form a laminated structure. More specifically, as illustrated in FIGS. 3 and 4, the tool holder is formed from four identical washerlike elements 56–59. Each of these washerlike elements, such as the element 56 illustrated in FIG. 6, includes a circular ring 56A and a resiliently flexible arm 51 which is fixed to the ring 56A, as by being integrally connected to the inner periphery thereof. The washerlike element 56 can thus be suitably stamped from a sheet of thin material, preferably spring material, with the arm 51 then being suitably bent so as to project at the desired angle with respect to the plane of the base ring 56A. Each of the remaining rings 57–59 is identical to the ring 56, as above described.

To form the tool holder 18 from the plurality of identical washer elements 56–59, the four elements are positioned with the base rings in axially stacked relationship. The base rings are then suitably fixedly connected, as by an adhesive or by any other conventional securing means, thereby resulting in formation of the support ring 49. During stacking of the washerlike elements 56–59, however, the various elements are positioned so that the individual tool gripping arms are substantially uniformly spaced apart so as to result in the two pairs of opposed arms 51–52 and 53–54, with the two pairs of arms being on axially opposite sides of the support ring, and with the two pairs being angularly displaced with respect to the longitudinal axis 14 of the chuck.

As illustrated in FIG. 3, the washerlike elements are preferably axially stacked such that one arm of each pair is connected to the endmost element, whereas the other arm of each pair is connected to the adjacent inner element. For example, the arm 51 is integral with the outermost washerlike element, whereas the opposed arm 52 is integral with the next adjacent innermost element 57. The other pair of arms 53 and 54 are similarly related to the washers 58 and 59. This thus results in the radially outer ends of the arms of each pair being axially displaced from one another so that, even though the arms are of the same radial length, they will nevertheless fold one over the other (as indicated by dotted lines in FIG. 3) so as to permit their opposed inward movement into gripping engagement with the shank of a small diameter drill bit, such as the shank 13' illustrated in FIG. 3.

The arms 51–52 are positioned whereby they are engaged, intermediate their ends, by the shoulder 46 formed on the actuator 17 when the latter is moved axially toward the support 16, so as to resiliently deflect the arms 51–52 inwardly toward one another into gripping engagement with the tool shank. Simultaneously therewith, the other arms 53–54 are engaged by the shoulder 31 formed on the support 16 and are similarly resiliently deflected inwardly for gripping engagement with the tool shank.

OPERATION

The operation of the chuck 10 will be briefly described to insure a complete understanding thereof.

Assuming that the chuck 10 is in a condition of nonuse and hence does not have a tool shank 13 mounted therein, then the support 16 and actuator 17 are normally spaced a substantial axial distance apart so that the tool holder 18 is thus rather loosely confined within the chamber defined between these two members. The tool shank 13 can then be axially slidably inserted into the chuck, as by manually inserting the free end of the shank through the bore 43 and through the holder 18 into the inner bore 26. The actuator 17 is then rotated to cause tightening of the chuck, and for this purpose the actuator 17 normally is provided with a knurled or other suitable exterior gripping surface to permit manual gripping and rotation thereof. This rotation of actuator 17 causes it to be rotated and axially moved with respect to the support 16, whereby support 16 and actuator 17 are thus relatively axially moved toward one another so that the corner 46 engages the arms 51-52, and the corner 31 engages the arms 53-54. No significant resilient deflection or deformation of these arms occurs until the two pairs of arms are each engaged with the respective shoulder. Prior to this engagement, the holder 18 will freely axially slide within the bore 28 until becoming properly centered between and engaged by both of the shoulders.

Continued rotation of actuator 17, after both shoulders 31 and 46 have engaged the respective pairs of arms, results in all of the arms 51-54 being resiliently deflected so that the free ends thereof move radially inwardly into gripping engagement with the tool shank 13. This gripping engagement of the tool shank, and the proper centering of the latter, results from the provision of the notched profile 55 formed on the free end of each arm which results in each arm engaging the arm at a pair of spaced pointlike contact areas. The actuator 17 will be manually rotated sufficiently to result in all of the arms being deflected and resiliently deformed to a sufficient extend so as to result in secure gripping engagement with the tool shank 13, whereby the shank is maintained coaxially aligned with the axis 14 and is nonrotatably coupled to the chuck. Driving torque can then be transmitted from the drive shaft 11 through the chuck to the drill shank 13.

Since the tool holder 18 can be laminated from four identical washerlike elements, this thus permits the tool holder to be manufactured in an economical and efficient manner inasmuch as all of these washers can be easily formed, as by being stamped from a thin sheet of metal plate.

It will be appreciated that the tool holder can be provided with fewer arms, such as three, or can be provided with a greater number of arms if necessary. If the holder becomes seriously deformed or damaged so as to require replacement thereof, then this can be easily accomplished merely by removing the actuator 17 and slidably inserting a new holder within the bore 28.

When release of the drill shank 13 is desired, then the reverse sequence is carried out, namely the actuator 17 is manually rotated in the opposite direction whereby the shoulders 31 and 46 are thus axially separated so that the natural resiliency of the arms 51-54 causes them to radially move outwardly away from and hence disengage the drill shank.

It will be appreciated that the support 16 and actuator 17 can assume other shapes consistent with the design requirements of the drill or other device on which it is to be mounted. Further, the camming shoulders 31 and 46 can themselves be modified so as to eliminate the sharp corner, as by replacing same with a tapered conical camming surface if desired, which surface would result in a less concentrated point of contact with the resilient arms.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a drill chuck having a rotatable housing means and tool holding means supported thereon and disposed for grippingly engaging the shank of a tool, the improvement wherein said tool holding means comprises a support ring and a plurality of resilient arms fixed to said support ring in angularly spaced reltionship and projecting radially inwardly therefrom, said arms having surface means on the inner free ends thereof adapted for gripping engagement with the tool shank, said support ring being of a laminated construction and formed from a plurality of ringlike washers which are axially stacked and fixedly connected together, and at least some of said washers having said resilient arms fixedly and integrally connected thereto.

2. A chuck according to claim 1, wherein a first pair of said arms are connected to said support ring at diametrically opposite locations and extend axially outwardly toward one side of said ring, and a second pair of said arms being connected to said support ring at diametrically opposite locations and projecting axially outwardly from the other side of said ring, said first and second pairs of arms being angularly spaced apart relative to the rotational axis of said chuck.

3. A chuck according to claim 2, wherein said support ring is formed from at least four axially stacked flat platelike washers which are fixedly connected together, said four washers being identical and each having one of said arms fixedly and integrally connected thereto.

4. A chuck according to claim 3, wherein the surface means defined adjacent the free end of each said arm is formed by a V-shaped notch formed in the free end of each said arm.

5. A chuck according to claim 3, wherein said housing means is formed by first and second housing parts which are relatively axially movable toward and away from one another, said housing parts supporting said tool holding means therebetween, and said first and second housing parts having opposed means associated therewith and disposed for engaging said arms as said first and second parts are moved axially toward one another for resiliently deflecting the arms radially inwardly into gripping engagement with a tool shank.

6. A chuck according to claim 1, wherein said housing means is formed by first and second housing parts which are relatively axially movable toward and away from one another, said housing parts supporting said tool holding means therebetween, and said first and second housing parts having opposed means associated therewith and disposed for engaging said arms as said first and second parts are moved axially toward one another for resiliently deflecting the arms radially inwardly into gripping engagement with a tool shank.

7. A chuck according to claim 6, wherein one of said housing parts has a cylindrical bore in which said support ring is axially slidably confined.

8. A chuck according to claim 1, wherein said plurality of washers are each formed from a thin flat platelike material and each have one of said resilient arms fixedly and integrally connected thereto, all of said washers being identical.

9. A chuck according to claim 2, wherein said housing means includes first and second housing parts which are threadably connected together for relative rotation therebetween, one of said housing parts having an interior bore formed coaxially therein, said support ring being axially slidably guided within said bore, and means formed on both of said first and second housing parts in axially spaced and opposed relationship, said last-mentioned means being positioned for engaging said arms and resiliently deflecting same radially inwardly when said first and second housing parts are relatively rotated with respect to one another for moving said housing parts axially toward one another.

10. In a drill chuck having a rotatable housing means and tool holding means supported thereon and disposed for grippingly engaging the shank of a tool, comprising the improvement wherein said tool holding means includes a support ring adapted to be positioned in surrounding relationship to the tool shank, a first plurality of resilient arms fixed to said support ring in equally angularly spaced relationship, the arms of said first plurality projecting radially inwardly from said support ring and axially away from one side thereof for permitting gripping of the tool shank at a first location disposed axially on one side of said support ring, a second plurality of resilient arms fixed to said support ring in equally angularly spaced relationship, the arms of said second plurality projecting radially inwardly from said support ring and axially outwardly from the other side thereof for permitting gripping of the tool shank at a second location which is axially spaced from the other side of said support ring and is also axially spaced from said first location, each of said resilient arms extending at a substantial angle relative to the axial direction of the tool shank and being of a thin platelike structure having a surface on the inner free end thereof for creating a pointlike contact area with the tool shank.

11. A chuck according to claim 10, wherein the surface defined adjacent the free end of said arm is formed by a V-shaped notch which projects inwardly from the free end of each said arm, whereby each said arm engages the tool shank at two circumferentially spaced pointlike contact areas.

12. A chuck according to claim 11, wherein said first plurality of arms includes only two arms which are connected to said support ring at diametrically opposite locations, said second plurality of arms also including only two arms connected to said support ring at diametrically opposite locations, and the arms of said first plurality being located substantially within a first diametral plane which extends transversely to a second diametral plane defined by the positioning of the arms of said second plurality.

13. A chuck according to claim 10, wherein said housing means includes first and second housing parts which are connected together for relative axial movement toward and away from one another, one of said housing parts having an interior bore formed coaxially therein, said support ring being axially slidably guided within said bore, and means formed on both of said first and second housing parts in axially spaced and opposed relationship for engaging said arms and resiliently deflecting the arms radially inwardly into gripping engagement with the tool shank when the first and second housing parts are relatively moved axially toward one another, said support ring being free to axially slidably move within said bore as said arms are resiliently deflected radially inwardly into gripping engagement with the tool shank.

* * * * *